(12) United States Patent
Masuda et al.

(10) Patent No.: US 8,919,474 B2
(45) Date of Patent: Dec. 30, 2014

(54) WHEEL LOADER

(75) Inventors: Hideki Masuda, Komatsu (JP); Shirou Kanamori, Kanazawa (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/235,215

(22) PCT Filed: May 10, 2012

(86) PCT No.: PCT/JP2012/062000
§ 371 (c)(1),
(2), (4) Date: Jan. 27, 2014

(87) PCT Pub. No.: WO2013/021699
PCT Pub. Date: Feb. 14, 2013

(65) Prior Publication Data
US 2014/0175833 A1    Jun. 26, 2014

(30) Foreign Application Priority Data
Aug. 8, 2011   (JP) .................................. 2011-172811

(51) Int. Cl.
*B62D 23/00* (2006.01)
*E02F 9/08* (2006.01)
*B60R 3/00* (2006.01)
*E02F 9/16* (2006.01)
(52) U.S. Cl.
CPC . *E02F 9/08* (2013.01); *B60R 3/005* (2013.01); *E02F 9/0833* (2013.01); *E02F 9/0841* (2013.01); *E02F 9/16* (2013.01); *E02F 9/0883* (2013.01); *E02F 9/163* (2013.01)
USPC .......................................... 180/89.1; 296/198

(58) Field of Classification Search
USPC .......................................... 180/89.1; 296/198
See application file for complete search history.

(56) References Cited

U.S. PATENT DOCUMENTS

| | | | | |
|---|---|---|---|---|
| 3,879,059 | A * | 4/1975 | Gibes ............................ | 280/848 |
| 3,997,183 | A | 12/1976 | Russey | |
| 4,085,815 | A * | 4/1978 | Miller ........................... | 180/54.1 |
| 5,460,411 | A * | 10/1995 | Becker .......................... | 280/851 |
| 6,112,139 | A * | 8/2000 | Schubert et al. .................. | 701/2 |
| 6,913,289 | B2 * | 7/2005 | Brockway ..................... | 280/848 |

(Continued)

FOREIGN PATENT DOCUMENTS

| | | |
|---|---|---|
| CN | 2797451 Y | 7/2006 |
| JP | S56-51649 | 5/1981 |

(Continued)

*Primary Examiner* — Toan To
(74) *Attorney, Agent, or Firm* — Drinker Biddle & Reath LLP

(57) ABSTRACT

A rear wheel is attached to a side of a rear vehicle body. A platform is attached to the side of the rear vehicle body so as to be located above the rear wheel. The platform is provided with an opening formed by a through hole, and the opening is located within a range obtained by projecting the rear wheel upwardly and located on the rear vehicle body side with respect to a center (center line A-A) of a width A1 of the rear wheel when the rear wheel is viewed from above. A plate member extending only in a front-rear direction of the vehicle body in the opening is provided. As a result, there can be obtained a wheel loader having good workability in inspection and maintenance of an engine room front and having good driver's rearward visibility during the operations.

9 Claims, 7 Drawing Sheets

(56) References Cited

U.S. PATENT DOCUMENTS

| | | | |
|---|---|---|---|
| 2007/0095977 A1* | 5/2007 | Gabrys | 244/103 R |
| 2012/0247846 A1* | 10/2012 | Ichikawa | 180/65.21 |
| 2012/0274101 A1* | 11/2012 | Myslak et al. | 296/198 |

FOREIGN PATENT DOCUMENTS

| | | |
|---|---|---|
| JP | S60-183677 U | 12/1985 |
| JP | S62-13133 U | 1/1987 |
| JP | H06-171429 A | 6/1994 |
| JP | H07-187589 A | 7/1995 |
| JP | H09-142217 A | 6/1997 |
| JP | 2001-026239 A | 1/2001 |
| JP | 2001-105957 A | 4/2001 |
| JP | 2001-151166 A | 6/2001 |
| JP | 2002-079837 A | 3/2002 |
| JP | 2002-088819 A | 3/2002 |
| JP | 2005-067533 A | 3/2005 |
| JP | 2005-133492 A | 5/2005 |
| JP | 2005-335446 A | 12/2005 |
| JP | 2006-298048 A | 11/2006 |
| JP | 2007-162358 A | 6/2007 |
| JP | 2007-169917 A | 7/2007 |
| JP | 2007-283801 A | 11/2007 |
| JP | 2008-222204 A | 9/2008 |
| JP | 2008-248523 A | 10/2008 |
| JP | 2010-059749 A | 3/2010 |
| JP | 2010-084322 A | 4/2010 |
| JP | 2010-163035 A | 7/2010 |
| JP | 2011-245987 A | 12/2011 |
| JP | 2011-245988 A | 12/2011 |
| WO | WO 97/44233 A1 | 11/1997 |

* cited by examiner

WHEEL LOADER

TECHNICAL FIELD

The present invention relates to a wheel loader.

BACKGROUND ART

Generally, a wheel loader is larger in size and higher in vehicle height than ordinary vehicles. Therefore, a step ladder is required in order that an operator can climb up and down during inspection and maintenance of an engine room front (e.g., air cleaner) of the wheel loader. However, placement and removal of the step ladder every time the operator performs the operations require a large amount of labor for the operator.

In addition, in the wheel loader, rear wheels are normally located at the sides of the engine room front. Therefore, the operator needs to place the step ladder beside the rear wheel and perform the operations such as inspection and maintenance through the rear wheel, and thus, workability is not good.

Thus, it is conceivable to place and extend a foothold such as a platform from a driver's seat floor toward the vehicle body rear side.

An example of the platform is disclosed in, for example, Japanese Patent Laying-Open No. 2005-67533.

However, when the platform is placed and extended toward the vehicle body rear side, the driver's rearward view is obstructed by the platform during the operations. As a result, the driver cannot directly look at both the rear wheel and its surroundings at the same time, and it is difficult for the driver to check an obstacle near the rear wheel, and safety check in the rearward may become insufficient.

CITATION LIST

Patent Document

PTD 1: Japanese Patent Laying-Open No. 2005-67533

SUMMARY OF INVENTION

Technical Problem

Japanese Patent Laying-Open No. 2005-67533 does not, however, disclose a technique for looking at the rearward from the driver's seat during particular operations of the wheel loader.

The present invention has been made in light of the aforementioned problems and an object of the present invention is to provide a wheel loader having good workability in inspection and maintenance of an engine room front and having good driver's rearward visibility during the operations.

Solution to Problem

A wheel loader according to the present invention includes: a vehicle body; a rear wheel; a platform; and a plate member. The rear wheel is attached to a side of the vehicle body. The platform is attached to the side of the vehicle body so as to be located above the rear wheel. The platform is provided with an opening formed by a through hole, and a front end and a rear end of the opening are located within a range obtained by projecting the rear wheel upwardly in a side view and located on the vehicle body side with respect to at least a center of a width of the rear wheel in a top view. The plate member extending only in a front-rear direction of the vehicle body in the opening is provided.

According to the wheel loader of the present invention, the platform is attached to the side of the vehicle body so as to be located above the rear wheel. Therefore, using this platform as a foothold, the operator can perform inspection and maintenance of the upper portion of the rear wheel. Thus, the step ladder is unnecessary at the time of maintenance and the operator does not need to lean forward from the driver's seat floor. Therefore, the workability is good.

In addition, this platform is provided with the opening formed by a through hole, and this opening is located within the range obtained by projecting the rear wheel upwardly and located on the vehicle body side with respect to the center of the width of the rear wheel when the rear wheel is viewed from above. Therefore, the driver seated in the driver's seat can look at both the rear wheel and the ground around this rear wheel through this opening at the same time. Thus, the rearward visibility is good and an obstacle near the rear wheel can be easily checked. Therefore, safety in the rearward can be sufficiently checked.

The wheel loader of the present invention further includes the plate member extending in the front-rear direction of the vehicle body in the opening. Therefore, even if the opening is increased in size, passage of stones and the like thrown up by the rear wheel through the opening can be suppressed by the plate member and damage to the vehicle body caused by the stones and the like can be suppressed. Even if the opening is increased in size, the plate member also prevents the operator from making a misstep or stumbling on the opening when the operator walks on the platform. In addition, the opening does not need to be covered with a lid. Furthermore, the opening can be increased in size, and thus, the driver can look at the rear wheel and the surroundings of this rear wheel with a wide view.

In addition, the plate member extends in the front-rear direction of the vehicle body. Therefore, obstruction of the driver's rearward view by the plate member is suppressed.

In the aforementioned wheel loader, an operating room having a driver's seat, a rear window located to rearward of the driver's seat, and a rear pillar is attached to the vehicle body, and the opening is located between the rear pillar and an operating oil tank of the vehicle body located to rearward of the operating room when a driver seated in the driver's seat looks to rearward of the vehicle body through the rear window.

In the aforementioned wheel loader, an operating room having a driver's seat, a rear window located to rearward of the driver's seat, and a rear pillar is attached to the vehicle body, and the opening is located between the rear pillar and an operating oil tank of the vehicle body located to rearward of the operating room in sight of an eye point of a driver when the driver seated in the driver's seat looks to rearward of the vehicle body through the rear window.

In the aforementioned wheel loader, an operating room having a side window is attached to the vehicle body, and assuming, when the vehicle body is viewed from the side, a tangent of an outer diameter of the rear wheel passing through a lower rear corner of the side window, a first line passing through the lower rear corner of the side window and a maximum ground height position of the outer diameter of the rear wheel, and a second line symmetric about the first line with respect to the tangent, the opening is arranged in a region located between a point where the platform and the first line intersect with each other and a point where the platform and the second line intersect with each other.

In the aforementioned wheel loader, the plate member is attached to the opening from a lower side of the platform. This prevents the operator who walks and performs operations on the platform from stumbling on the plate member.

In the aforementioned wheel loader, the plate member is attached to the opening to divide the opening into widths of less than 20 mm. Therefore, passage of the stones and the like thrown up by the rear wheel through the opening can be effectively suppressed by the plate member.

In the aforementioned wheel loader, the opening is surrounded by the platform. Therefore, the opening has rigidity.

In the aforementioned wheel loader, one side of the opening is open to an interior of the vehicle body. Therefore, the driver's rearward visibility is improved.

In the aforementioned wheel loader, a notch portion tapered outward from the vehicle body side is formed in a side upper part of the operating oil tank. Therefore, the driver can easily look at the opening.

Advantageous Effects of Invention

As described above, according to the present invention, the platform is attached to the side of the vehicle body so as to be located above the rear wheel, and thus, the workability is good. In addition, the platform is provided with the opening formed by a through hole, and thus, the rearward visibility is good and safety in the rearward can be sufficiently checked.

DESCRIPTION OF EMBODIMENTS

An embodiment of the present invention will be described hereinafter with reference to the drawings.

A configuration of a wheel loader according to the embodiment of the present invention will be described first with reference to FIGS. 1 and 2.

Figure 1:
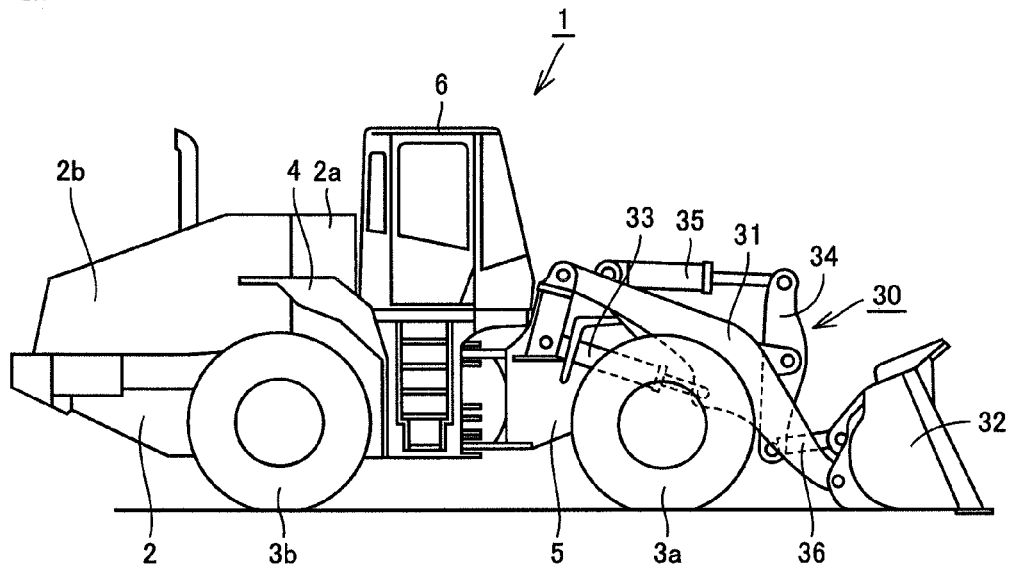
FIG. 1 is a side view schematically showing a configuration of a wheel loader according to an embodiment of the present invention.
Figure 2:
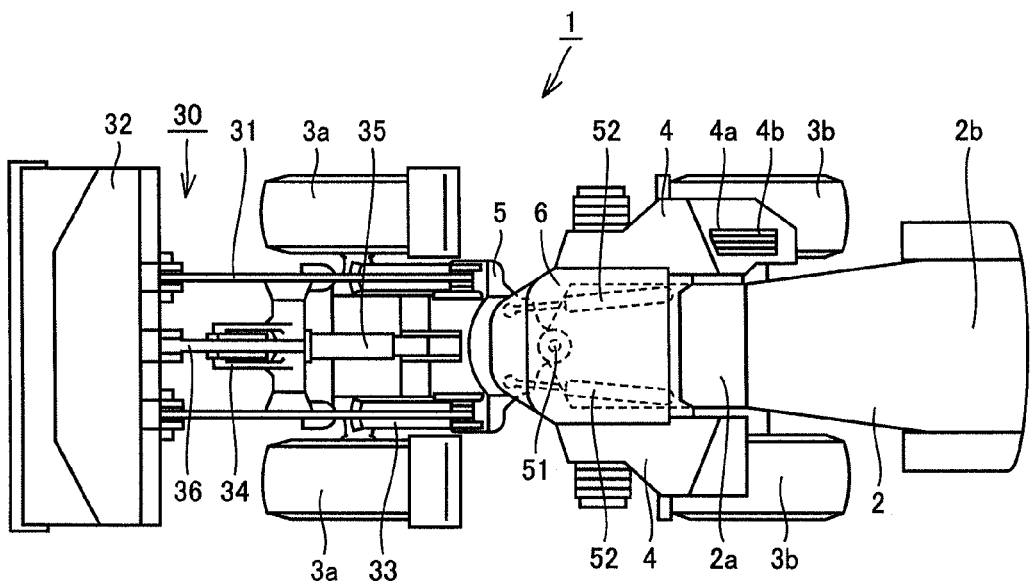
FIG. 2 is a top view schematically showing the configuration of the wheel loader according to the embodiment of the present invention.

Referring to FIGS. 1 and 2, a wheel loader 1 according to the present embodiment mainly has a rear vehicle body 2, a front frame 5 and a working machine 30. Front wheels 3a are attached to the respective sides of front frame 5, and rear wheels 3b are attached to the respective sides of rear vehicle body 2.

Rear vehicle body 2 and front frame 5 are attached by a center pin 51 so as to freely swing to the right and left, and constitute an articulate structure. In other words, rear vehicle body 2 and front frame 5 are linked by one pair of right and left steering cylinders 52 and 52, and rear vehicle body 2 and front frame 5 are configured to swing to the right and left around center pin 51 and to be steered when these right and left steering cylinders 52 and 52 are extended and contracted. These rear vehicle body 2 and front frame 5 constitute a vehicle body of wheel loader 1.

Working machine 30 is attached to a front part of front frame 5. Working machine 30 has a boom 31 having a base end swingably attached to front frame 5, and a bucket 32 swingably attached to a tip of boom 31. Front frame 5 and boom 31 are linked by one pair of boom cylinders 33 and 33, and boom 31 is configured to swing when boom cylinders 33 and 33 are extended and contracted.

Working machine 30 also has a tilt arm 34 swingably supported by boom 31 at a substantially central portion thereof, a bucket cylinder 35 linking a base end of tilt arm 34 and front frame 5, and a tilt rod 36 linking a tip of tilt arm 34 and bucket 32. Bucket 32 is configured to swing when bucket cylinder 35 is extended and contracted.

Figure 6:
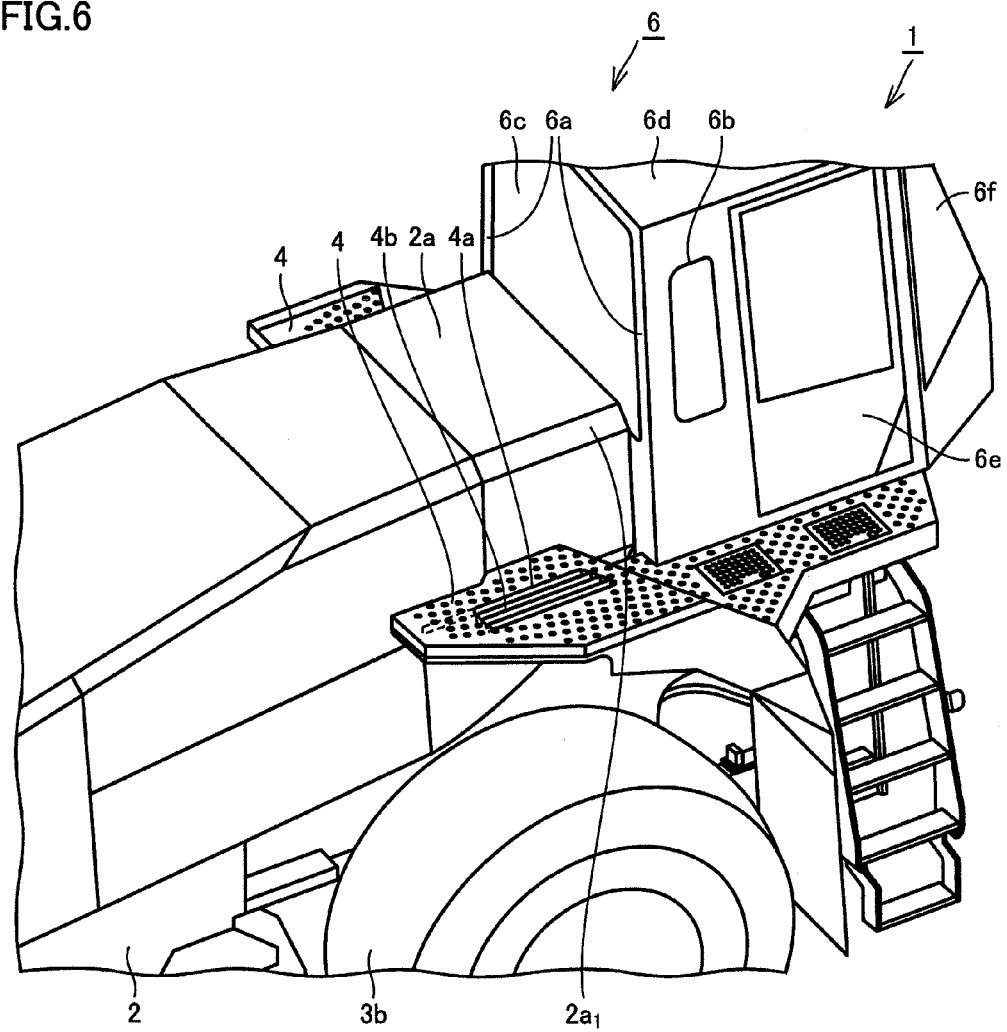
FIG. 6 is a partially enlarged perspective view of the wheel loader in FIGS. 1 and 2 showing a configuration around the platform.

An engine room 2b is arranged at a rear part of rear vehicle body 2, and an air cleaner and the like (not shown) are arranged inside rear vehicle body 2 at a front part of this engine room 2b. In addition, an operating room (e.g., cab) 6 is attached to an upper front part of rear vehicle body 2, and an operating oil tank 2a is arranged at a rear part of operating room 6. As shown in FIG. 6, operating room 6 is configured by one pair of front pillars (not shown), one pair of rear pillars 6a and 6a, a roof 6d, a front window 6f, a side window 6b, a rear window 6c, a door 6e, and the like. A platform 4 is attached to the side of rear vehicle body 2 by, for example, a bolt and the like. This platform 4 is arranged to extend from below the door of operating room 6 to above rear wheel 3b. As a result, platform 4 is arranged to extend to the lower side of a maintenance point such as the not-shown air cleaner. The air cleaner is covered with an exterior cover.

Platform 4 is provided with an opening 4a formed by a through hole. This opening 4a is surrounded (on all four sides) by platform 4, and thus, opening 4a has rigidity. Opening 4a is arranged at a position where the driver of wheel loader 1 seated in a driver's seat of operating room 6 can directly look at both rear wheel 3b and the ground near this rear wheel 3b at the same time through opening 4a of platform 4 when the driver looks at the rear part of the vehicle body. In order to improve the rearward visibility, one side of opening 4a may be open to the vehicle body side.

This position of opening 4a will be described hereinafter with reference to FIGS. 3 and 4.

Figure 3:
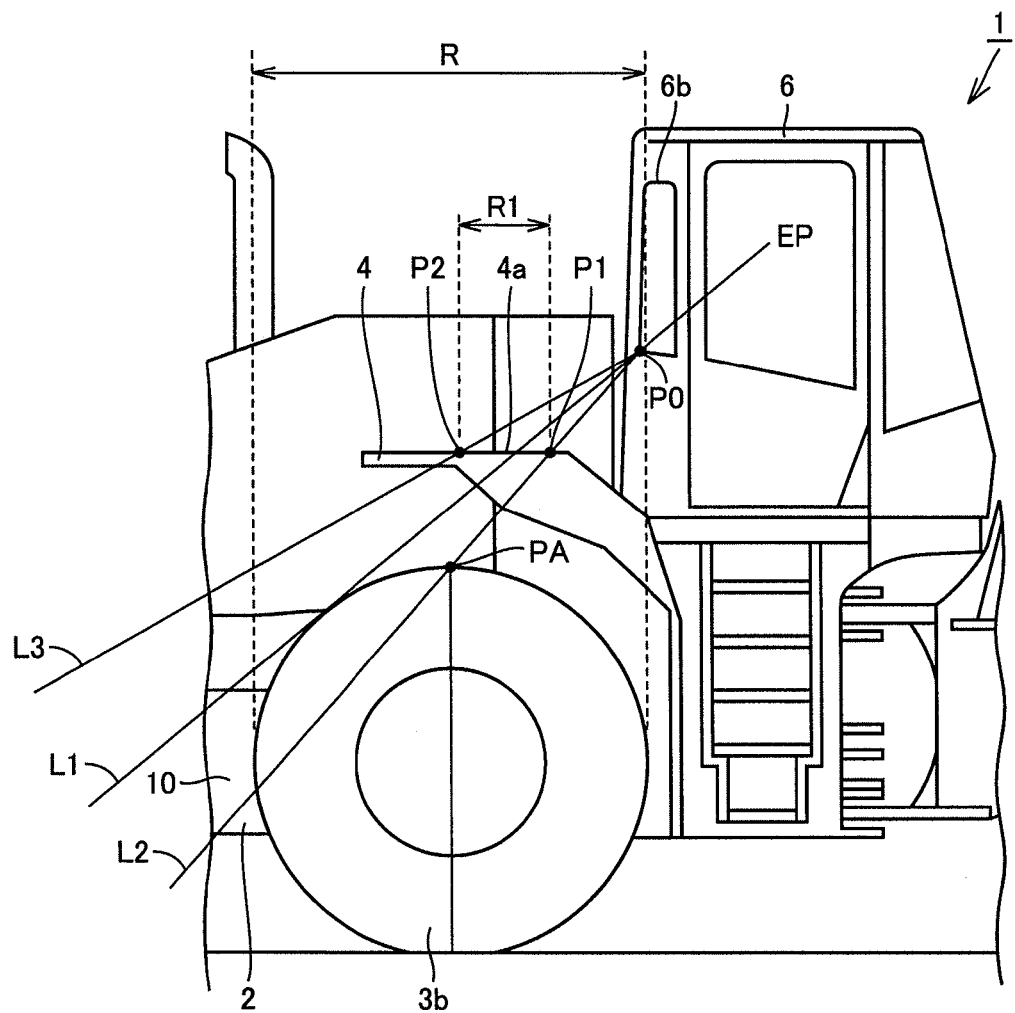
FIG. 3 is a partially enlarged side view of the wheel loader shown in FIG. 1 for describing a position of an opening provided in a platform.
Figure 4:
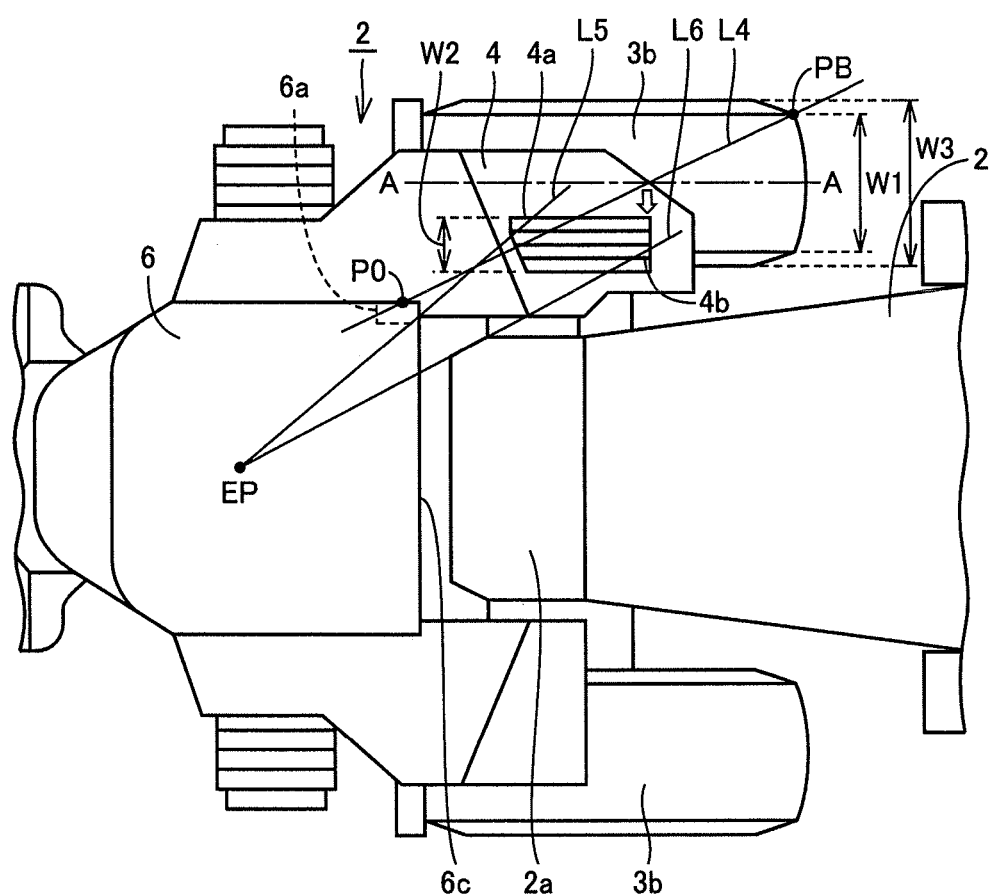
FIG. 4 is a partially enlarged top view of the wheel loader shown in FIG. 2 for describing the position of the opening provided in the platform.

Referring to FIGS. 3 and 4, a front end and a rear end of opening 4a are located within a range obtained by projecting rear wheel 3b upwardly (in the vertically upward direction) in a state where wheel loader 1 is arranged on a horizontal and flat surface. In other words, the front end and the rear end of opening 4a are located within a range R obtained by projecting rear wheel 3b upwardly as shown in FIG. 3 and located at a portion overlapping with at least rear wheel 3b when viewed from above as shown in FIG. 4, in the state where wheel loader 1 is arranged on a horizontal and flat surface. In addition, opening 4a is located on the vehicle body (rear vehicle body 2) side (on the hollow arrow side) with respect to at least a center (center line A-A) of the width of rear wheel 3*b* when rear wheel 3*b* is viewed from above (in a top view) as shown in FIG. 4. The width of rear wheel 3*b* may be a tire width (cross-sectional width of the tire) W1 or may be a total tire width W3.

More specifically, assuming, in a side view of the vehicle body shown in FIG. 3, a tangent L1 of an outer diameter of rear wheel 3*b* passing through a lower rear corner P0 of side window 6*b* of operating room 6, a first line L2 passing through lower rear corner P0 of side window 6*b* of operating room 6 and a maximum ground height position PA of the outer diameter of rear wheel 3*b*, and a second line L3 symmetric about first line L2 with respect to tangent L1, opening 4*a* is arranged at least in a region R1 located between a point P1 where platform 4 and first line L2 intersect with each other and a point P2 where platform 4 and second line L3 intersect with each other. In other words, as long as opening 4*a* is located in region R1, opening 4*a* may have the same length as that of region R1 or may be longer than region R1.

Herein, lower rear corner P0 of side window 6*b* of operating room 6 is used for the sake of convenience in a side view. Actually, lower rear corner P0 corresponds to a lower corner portion 6P (FIG. 5) on the rear pillar 6*a* side of rear window 6*c* that is invisible in a side view, and lower corner portion 6P is located on tangent L1 of the outer diameter of rear wheel 3*b* passing through P0 in a side view.

In addition, when viewed from above as shown in FIG. 4, opening 4*a* is arranged on a line L4 connecting lower rear corner P0 of side window 6*b* of operating room 6 and an outer corner PB at a rear part of rear wheel 3*b*. Opening 4*a* has, for example, a width W2 that is about a half of width W1 of rear wheel 3*b*.

When the driver seated in the driver's seat of operating room 6 looks at the rearward of the vehicle body through rear window 6*c* of operating room 6, the driver can look at opening 4*a* from a driver's eye point EP through a region between rear pillar 6*a* of operating room 6 and operating oil tank 2*a* of rear vehicle body 2 (i.e., between a line L5 and a line L6) as shown in FIG. 4. The driver can further look at rear wheel 3*b* and the ground around this rear wheel 3*b* through this opening 4*a*. The scenery at which the driver can look when the driver looks at rear wheel 3*b* and the ground around this rear wheel 3*b* from aforementioned eye point EP through opening 4*a* is, for example, as shown in FIG. 5.

Figure 5:
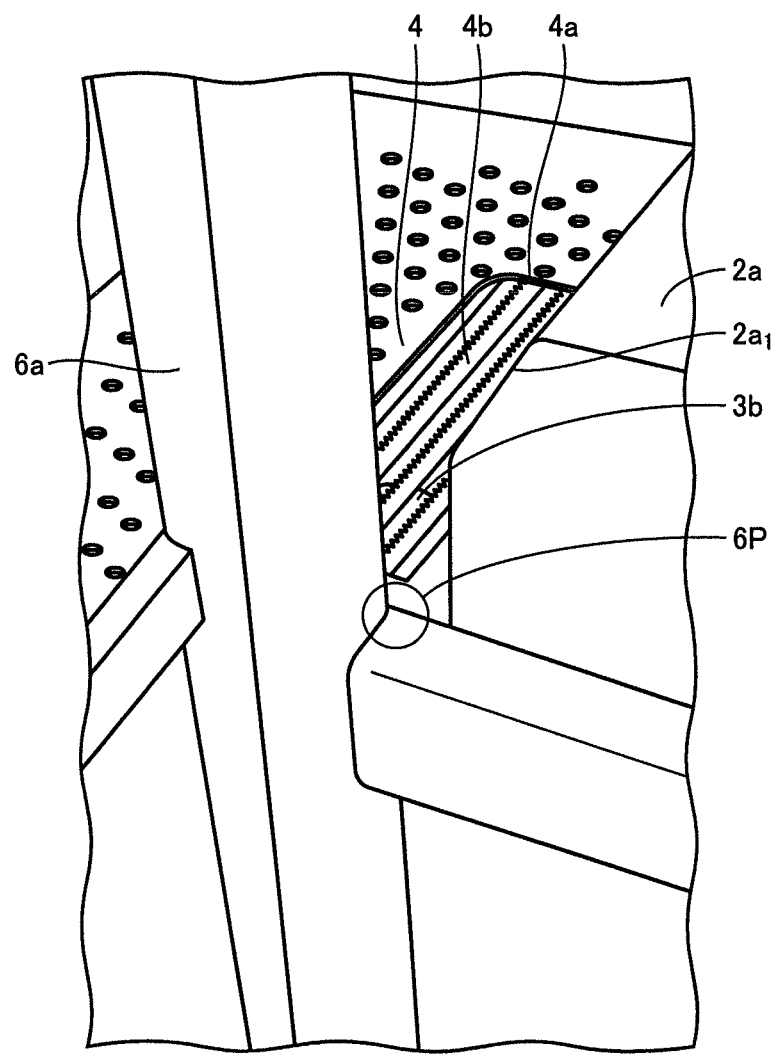
FIG. 5 shows how the opening of the platform and a tire are looked at when a driver seated in a driver's seat looks at a rearward.

As shown in FIGS. 5 and 6, a notch portion $2a_1$ tapered outward from the vehicle body side is formed in a side upper part of operating oil tank 2*a*. When operating oil tank 2*a* has a corner portion at the upper part thereof, this corner portion obstructs the driver's view. Therefore, notch portion $2a_1$ is formed to cut out this corner portion, and thereby the driver can easily look at opening 4*a* from aforementioned eye point EP.

Aforementioned eye point EP can be set using a 50% tile manikin of an adult male defined in, for example, JIS D 4607 "Three dimensional manikins for use in defining automobile seating accommodations (3DM-JM 50)" or ISO 6549 "road vehicles-Procedure for H-point determination". This eye point EP can be set as a reference point in the vehicle cabin, and specifically, can be set in accordance with a method defined in, for example, "Annex 81 of Announcement that Prescribes Details of Safety Regulations for Road Vehicles (Ministry of Land, Infrastructure, Transport and Tourism)".

A plate member 4*b* is attached to this opening 4*a*. This plate member 4*b* will be described with reference to FIGS. 7 to 9.

Figure 7:
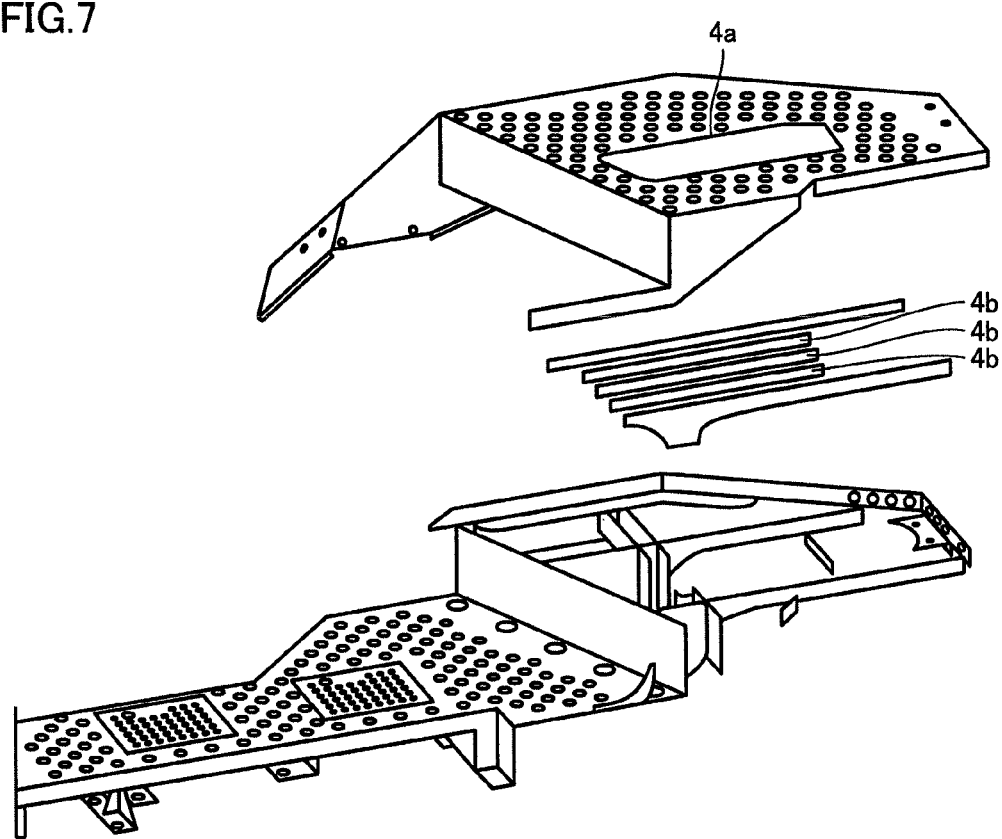
FIG. 7 is an exploded perspective view of the platform used in the wheel loader according to the embodiment of the present invention.
Figure 8:
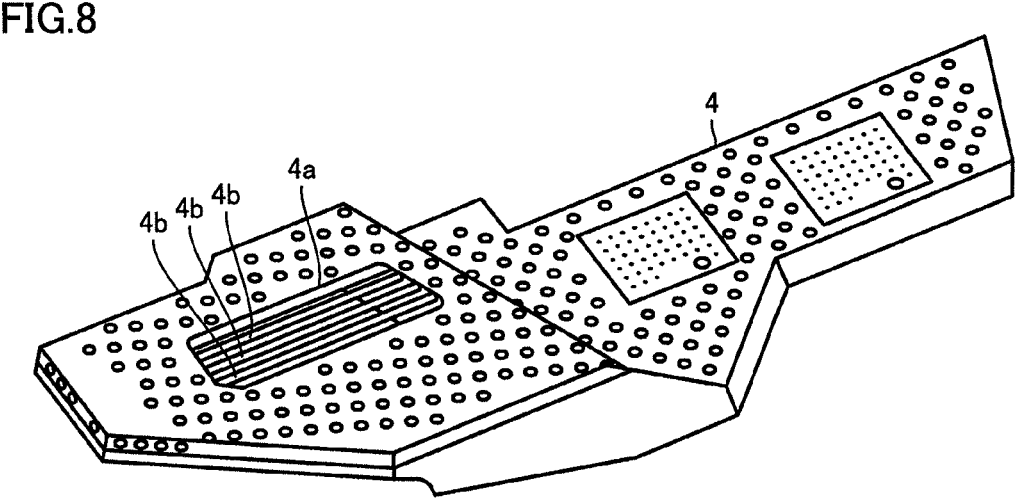
FIG. 8 is an assembly perspective view of the platform used in the wheel loader according to the embodiment of the present invention.
Figure 9:
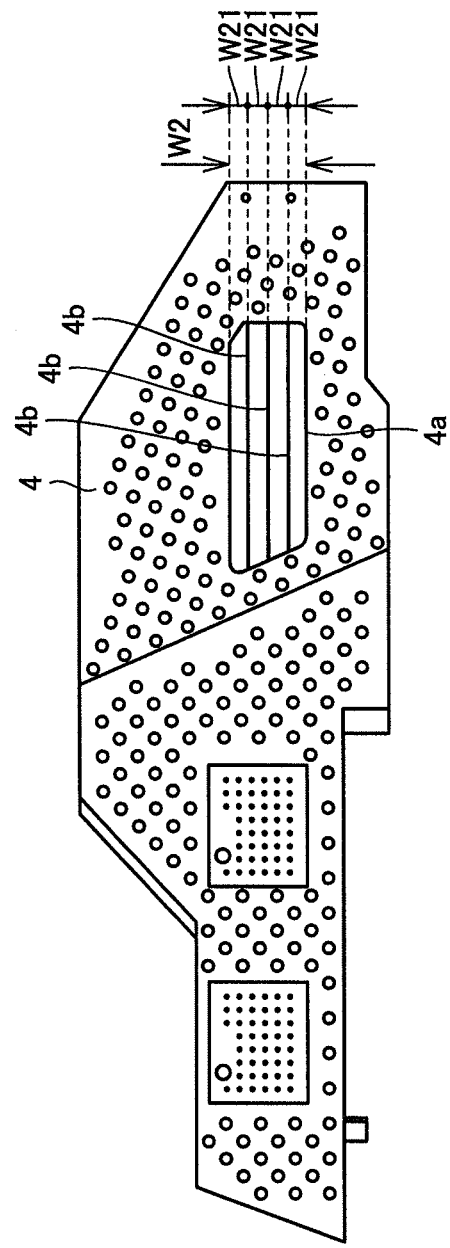
FIG. 9 is an assembly top view of the platform used in the wheel loader according to the embodiment of the present invention.

Referring to FIGS. 7 and 8, one or more (e.g., three) plate members 4*b* are attached to opening 4*a* and are attached to opening 4*a* from the lower side of platform 4. In addition, plate members 4*b* are attached to platform 4 to extend in the front-rear direction of the vehicle body. In addition, as shown in FIG. 9, plate members 4*b* are attached to opening 4*a* to divide a length of opening 4*a* in the width W2 direction into widths W21 of less than 20 mm. An upper part of plate members 4*b* preferably has a shape that prevents the operator from slipping.

Wheel loader 1 according to the present embodiment is generally used for an excavation operation and a loading operation. At the time of the excavation operation, boom 31 shown in FIGS. 1 and 2 is lowered, and wheel loader 1 travels forward with bucket 32 oriented to the front. Then, a blade edge of bucket 32 is thrust into an object. At this time, bucket cylinder 35 is operated to tilt bucket 32 back, and thereby bucket 32 can scoop up the object.

At the time of the loading operation, in a state where the scooped-up object is in bucket 32, boom cylinder 33 is extended and boom 31 is raised, and wheel loader 1 travels rearward with bucket 32 raised. Thereafter, wheel loader 1 is moved forward and brought closer to a dump truck. At a predetermined position, bucket cylinder 35 is operated such that bucket 32 dumps the object, and thereby the object is loaded onto the back of the dump truck.

As described above, wheel loader 1 according to the present embodiment travels forward and rearward repeatedly during the excavation operation and the loading operation, and thus, safety check in the front part and the rearward is important. Therefore, opening 4*a* for obtaining good rearward view is required.

Next, the function and effect of the present embodiment will be described.

According to the present embodiment, platform 4 is attached to the side of rear vehicle body 2 so as to be located above rear wheel 3*b*. Therefore, using this platform 4 as a foothold, the operator can perform inspection and maintenance of the upper portion (e.g., the air cleaner) of rear wheel 3*b*. Thus, the step ladder is unnecessary at the time of maintenance and the operator does not need to lean forward from the driver's seat floor. Therefore, the workability is good.

In addition, this platform 4 is provided with opening 4*a* formed by a through hole, and this opening 4*a* is located within the range obtained by projecting rear wheel 3*b* upwardly and located on the vehicle body (rear vehicle body 2) side with respect to the center (center line A-A) of width W1 or W3 of rear wheel 3*b* when rear wheel 3*b* is viewed from above. Therefore, the driver seated in the driver's seat can look at both rear wheel 3*b* and the ground around this rear wheel 3*b* through this opening 4*a* at the same time. Thus, in wheel loader 1 that travels forward and rearward repeatedly as described above, the rearward visibility is good and an obstacle and the like behind the rear wheel can be visually recognized. Therefore, safety in the rearward can be sufficiently checked.

Aforementioned wheel loader 1 has plate member 4*b* extending in the front-rear direction of the vehicle body in opening 4*a*. Therefore, even if opening 4*a* is increased in size, passage of stones and the like thrown up by rear wheel 3*b* through opening 4*a* can be suppressed by plate member 4*b* and damage to the vehicle body (rear vehicle body 2) caused by the stones and the like can be suppressed. Even if opening 4*a* is increased in size, plate member 4*b* also prevents the operator from making a misstep or stumbling on opening 4*a* when the operator walks on platform 4. In addition, opening 4*a* does not need to be covered with a lid. Furthermore, opening 4*a* can be increased in size, and thus, the driver can look at rear wheel 3*b* and the surroundings of this rear wheel 3*b* with a wide view.

In addition, plate member 4b is attached to opening 4a from the lower side of platform 4. This prevents the operator who walks and performs operations on platform 4 from stumbling on plate member 4b.

In addition, plate member 4b extends in the front-rear direction of the vehicle body. Therefore, obstruction of the driver's rearward view by plate member 4b is suppressed. It is also conceivable to provide plate member 4b in the right-left direction of the vehicle body for the purpose of reinforcement. In this case, the rearward view becomes worse.

In addition, plate member 4b is attached to opening 4a to divide opening 4a into widths of less than 20 mm. Therefore, passage of the stones and the like thrown up by rear wheel 3b through opening 4a can be effectively suppressed by plate member 4b.

In the aforementioned present embodiment, the case where opening 4a completely overlaps with rear wheel 3b when viewed from above as shown in FIG. 4 has been described. However, as long as opening 4a has at least a portion overlapping with rear wheel 3b, opening 4a does not always have to completely overlap with rear wheel 3b, and may protrude from rear wheel 3b toward the vehicle body side, for example.

In addition, in the aforementioned present embodiment, the case where platform 4 having opening 4a is provided on the right side of rear vehicle body 2 when viewed from the driver as shown in FIGS. 2 and 4 has been described. Platform 4 having opening 4a may, however, be provided only on the left side of rear vehicle body 2 or may be provided on the right and left sides of rear vehicle body 2.

In addition, in the aforementioned present embodiment, the case where the vehicle body of wheel loader 1 has rear vehicle body 2 and front frame 5 constituting the articulate structure has been described. The present invention is, however, also applicable to a vehicle body of wheel loader 1 that does not have the articulate structure.

It should be understood that the embodiment disclosed herein is illustrative and not limitative in any respect. The scope of the present invention is defined by the terms of the claims, rather than the description above, and is intended to include any modifications within the scope and meaning equivalent to the terms of the claims.

INDUSTRIAL APPLICABILITY

The present invention is particularly advantageously applicable to a wheel loader that travels forward and rearward repeatedly.

REFERENCE SIGNS LIST 1 wheel loader; 2 rear vehicle body; 2a operating oil tank; 2a₁ notch portion; 2b engine room; 3a front wheel; 3b rear wheel; 4 platform; 4a opening; 4b plate member; 5 front frame; 6 operating room; 6a rear pillar; 6b side window; 6c rear window; 6d roof; 6e door; 6f front window; 30 working machine; 31 boom; 32 bucket; 33 boom cylinder; 34 tilt arm; 35 bucket cylinder; 36 tilt rod; 51 center pin; 52 steering cylinder

The invention claimed is:

1. A wheel loader, comprising:
a vehicle body;
a rear wheel attached to a side of said vehicle body;
a platform attached to said side of said vehicle body so as to be located above said rear wheel, wherein
said platform is provided with an opening formed by a through hole, and a front end and a rear end of said opening are located within a range obtained by projecting said rear wheel vertically upward in a side view and located on said vehicle body side with respect to a centerline of a width of said rear wheel in a top view;
a plate member extending only in a front-rear direction of said vehicle body in said opening;
an operating room having a driver's seat, a rear window located to rearward of said driver's seat, and a rear pillar is attached to said vehicle body, and
said opening is located between said rear pillar and an operating oil tank of said vehicle body located to rearward of said operating room when a driver seated in said driver's seat looks to rearward of said vehicle body through said rear window.

2. The wheel loader according to claim 1, wherein said plate member is attached to said opening from a lower side of said platform.

3. The wheel loader according to claim 1, wherein said plate member is attached to said opening to divide said opening into widths of less than 20 mm.

4. The wheel loader according to claim 1, wherein said opening is surrounded by said platform.

5. The wheel loader according to claim 1, wherein one side of said opening is open to an interior of said vehicle body.

6. The wheel loader according to claim 1, wherein a notch portion tapered outward from said vehicle body side is formed in a side upper part of said operating oil tank.

7. A wheel loader, comprising:
a vehicle body;
a rear wheel attached to a side of said vehicle body;
a platform attached to said side of said vehicle body so as to be located above said rear wheel, wherein
said platform is provided with an opening formed by a through hole, and a front end and a rear end of said opening are located within a range obtained by projecting said rear wheel vertically upward in a side view and located on said vehicle body side with respect to a centerline of a width of said rear wheel in a top view;
a plate member extending only in a front-rear direction of said vehicle body in said opening, wherein
an operating room having a driver's seat, a rear window located to rearward of said driver's seat, and a rear pillar is attached to said vehicle body, and
said opening is located between said rear pillar and an operating oil tank of said vehicle body located to rearward of said operating room in sight of an eye point of a driver when the driver seated in said driver's seat looks to rearward of said vehicle body through said rear window.

8. The wheel loader according to claim 7, wherein a notch portion tapered outward from said vehicle body side is formed in a side upper part of said operating oil tank.

9. A wheel loader, comprising:
a vehicle body;
a rear wheel attached to a side of said vehicle body;
a platform attached to said side of said vehicle body so as to be located above said rear wheel, wherein
said platform is provided with an opening formed by a through hole, and a front end and a rear end of said opening are located within a range obtained by projecting said rear wheel vertically upward in a side view and located on said vehicle body side with respect to a centerline of a width of said rear wheel in a top view;
a plate member extending only in a front-rear direction of said vehicle body in said opening, wherein
an operating room having a side window is attached to said vehicle body, and assuming, when said vehicle body is viewed from the side, a tangent of an outer diameter of said rear wheel passing through a lower rear corner of said side window, a first line passing through the lower rear corner of said side window and a maximum ground height position of the outer diameter of said rear wheel, and a second line symmetric about said first line with respect to said tangent, said opening is arranged in a region located between a point where said platform and said first line intersect with each other and a point where said platform and said second line intersect with each other.

* * * * *